US012798672B2

(12) United States Patent
Byun

(10) Patent No.: US 12,798,672 B2
(45) Date of Patent: Nov. 17, 2026

(54) SENSING DEVICE

(71) Applicant: LG INNOTEK CO., LTD., Seoul (KR)

(72) Inventor: Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 231 days.

(21) Appl. No.: 18/691,669

(22) PCT Filed: Sep. 13, 2022

(86) PCT No.: PCT/KR2022/013611
§ 371 (c)(1),
(2) Date: Mar. 13, 2024

(87) PCT Pub. No.: WO2023/038490
PCT Pub. Date: Mar. 16, 2023

(65) Prior Publication Data
US 2024/0383530 A1 Nov. 21, 2024

(30) Foreign Application Priority Data
Sep. 13, 2021 (KR) ........................ 10-2021-0121500

(51) Int. Cl.
*B62D 6/10* (2006.01)
*G01L 3/10* (2006.01)

(52) U.S. Cl.
CPC . *B62D 6/10* (2013.01); *G01L 3/10* (2013.01)

(58) Field of Classification Search
CPC .......... B62D 5/005; B62D 5/006; B62D 5/04; B62D 5/0409; B62D 5/0412;
(Continued)

(56) References Cited

U.S. PATENT DOCUMENTS 9,109,965 B2 * 8/2015 Lee .................... B62D 15/0215
9,366,590 B2 * 6/2016 Song ....................... G01L 3/101
(Continued)

FOREIGN PATENT DOCUMENTS

CN 112805546 A 5/2021
EP 2664906 A2 * 11/2013
(Continued)

OTHER PUBLICATIONS

International Search Report dated Dec. 16, 2022 in International Application No. PCT/KR2022/013611.
(Continued)

*Primary Examiner* — Joshua E Rodden
(74) *Attorney, Agent, or Firm* — SALIWANCHIK, LLOYD & EISENSCHENK

(57) ABSTRACT

A sensing device can include: a rotor; a stator arranged to correspond to the rotor; and a first collector arranged on the stator and a second collector arranged under the stator, wherein: the first collector includes a first unit collector including a first plate and a first leg, and a second unit collector including a second plate and a second leg; the second collector includes a third unit collector including a third plate and a third leg, and a fourth unit collector including a fourth plate and a fourth leg; and the axial separation distance between the first plate and the stator is different from the axial separation distance between the second plate and the stator.

10 Claims, 15 Drawing Sheets

(58) Field of Classification Search

CPC .. B62D 5/0415; B62D 5/0457; B62D 5/0466; B62D 5/049; B62D 5/0493; B62D 6/08; B62D 6/10; B62D 15/0215; B62D 15/022; G01D 5/142; G01D 5/147; G01L 3/10; G01L 3/101; G01L 3/104; G01L 5/221; G01P 3/488

USPC .......................................................... 180/446

See application file for complete search history.

(56) References Cited

U.S. PATENT DOCUMENTS

| | | | | |
|---|---|---|---|---|
| 2008/0250873 | A1* | 10/2008 | Prudham | G01L 3/104 73/862.334 |
| 2018/0170432 | A1* | 6/2018 | Chowdhury | G01L 3/104 |
| 2021/0302246 | A1 | 9/2021 | Fröhlich | |
| 2023/0106907 | A1* | 4/2023 | Oswald | B62D 15/0215 73/862.325 |
| 2024/0255310 | A1* | 8/2024 | Byun | G01D 5/142 |

FOREIGN PATENT DOCUMENTS

| | | | | | |
|---|---|---|---|---|---|
| FR | 3093182 | B1 | * | 5/2021 | |
| JP | 2016-114405 | A | | 6/2016 | |
| KR | 10-0915264 | B1 | | 9/2009 | |
| KR | 2012069931 | A | * | 6/2012 | |
| KR | 101238549 | B1 | * | 2/2013 | B62D 6/10 |
| KR | 10-2016-0029987 | A | | 3/2016 | |
| KR | 10-1622723 | B1 | | 5/2016 | |
| KR | 10-2021-0034092 | A | | 3/2021 | |
| KR | 10-2022-0147482 | A | | 11/2022 | |
| KR | 20220147482 | A | * | 11/2022 | G01L 5/221 |
| KR | 20230049998 | A | * | 4/2023 | B62D 6/10 |
| WO | WO-2016167486 | A1 | * | 10/2016 | G01L 3/104 |
| WO | 2020/174170 | A1 | | 9/2020 | |

OTHER PUBLICATIONS

Office Action dated Aug. 28, 2026 in Chinese Application No. 2026082802375890.

Office Action dated Sep. 7, 2026 in Korean Application No. 10-2021-0121500.

* cited by examiner

FIG. 10A
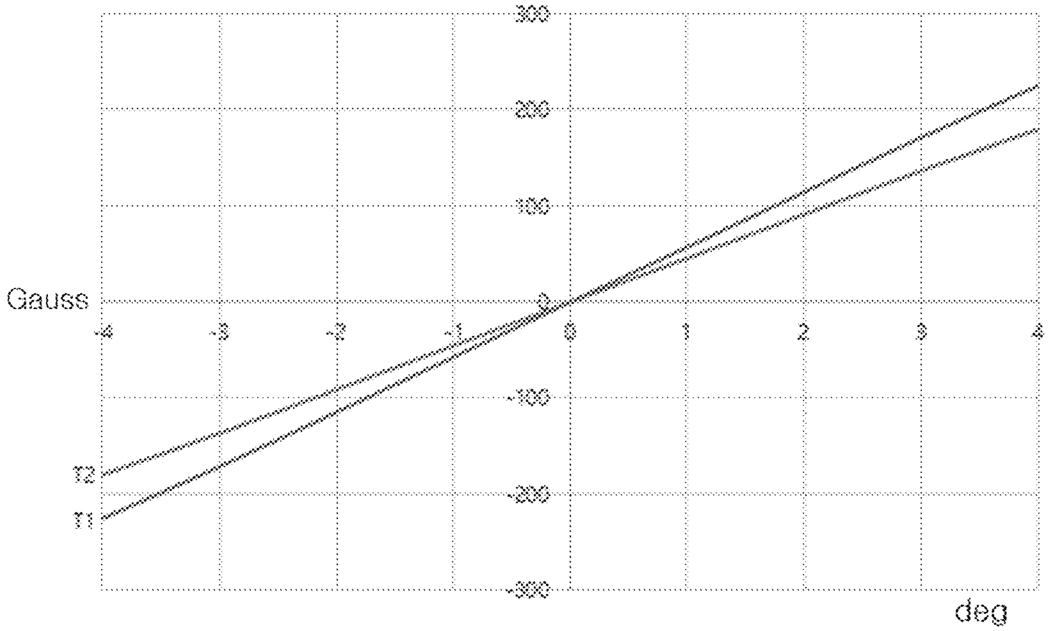
(a)
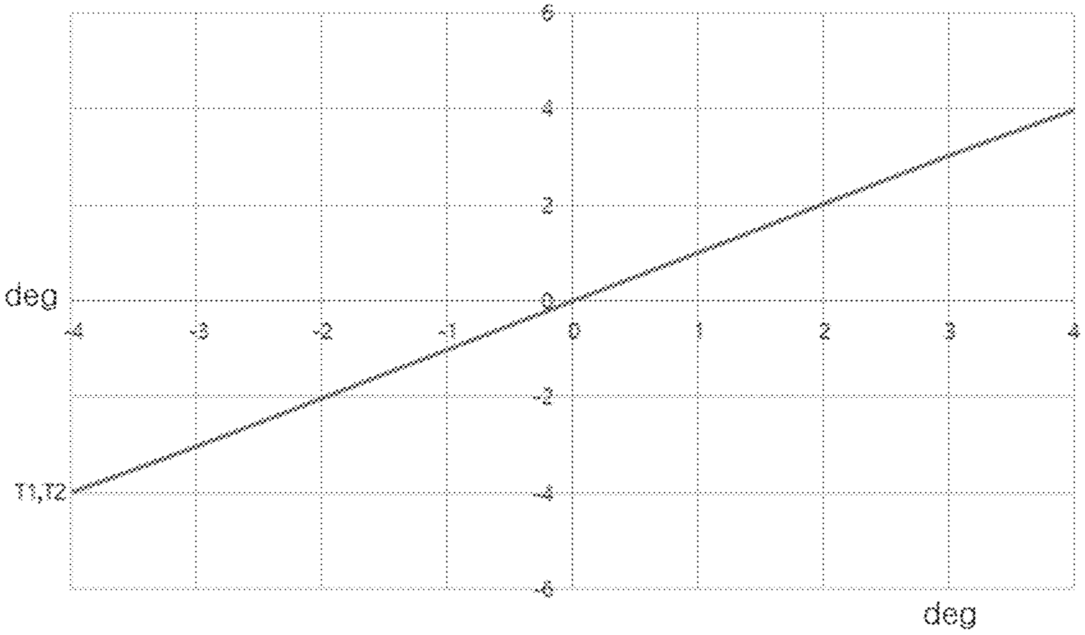
(b)
FIG. 10B

FIG. 11A
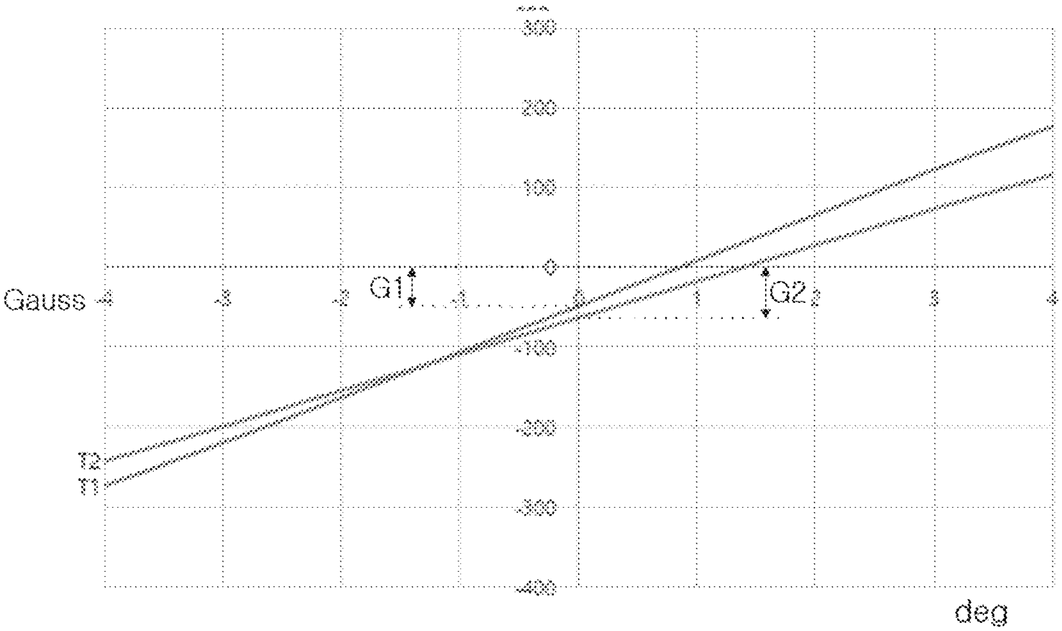
(a)
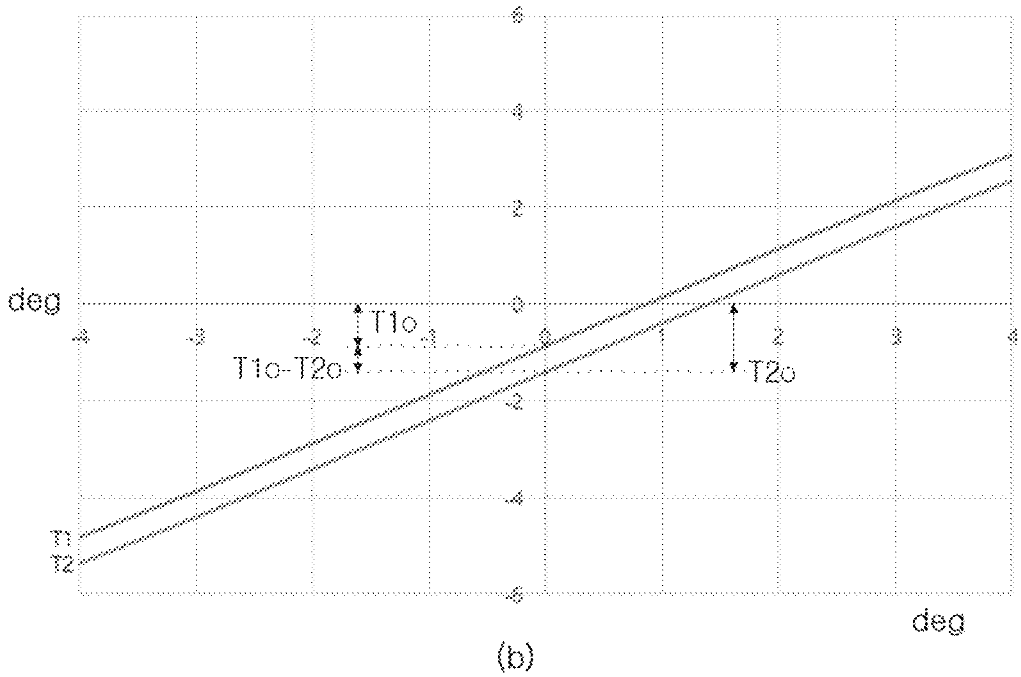
(b)
FIG. 11B

FIG. 12A
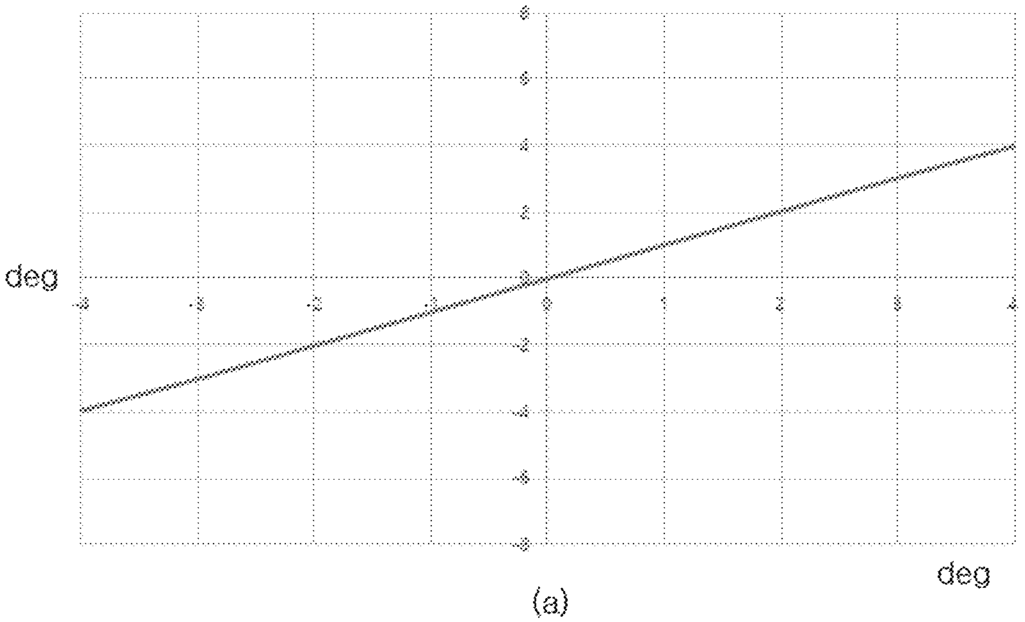
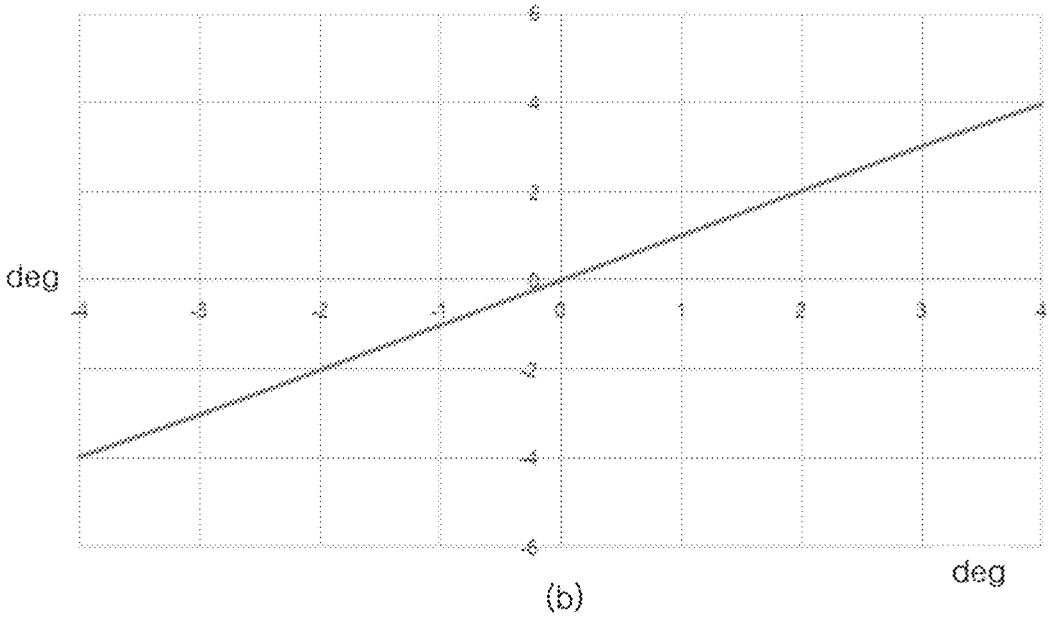
FIG. 12B

FIG. 13A
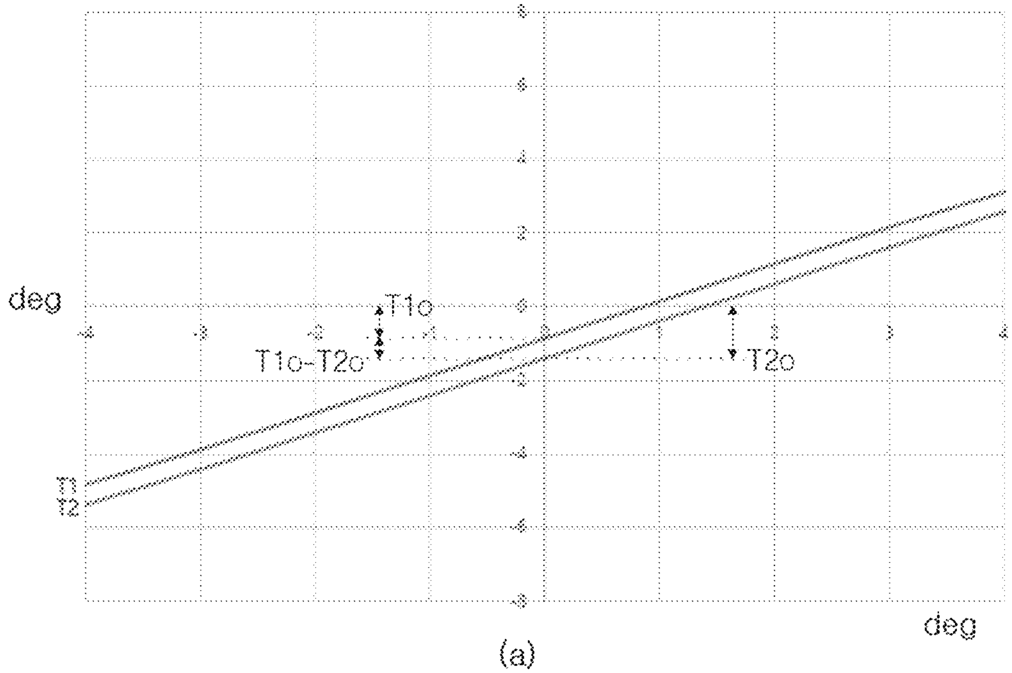
(a)
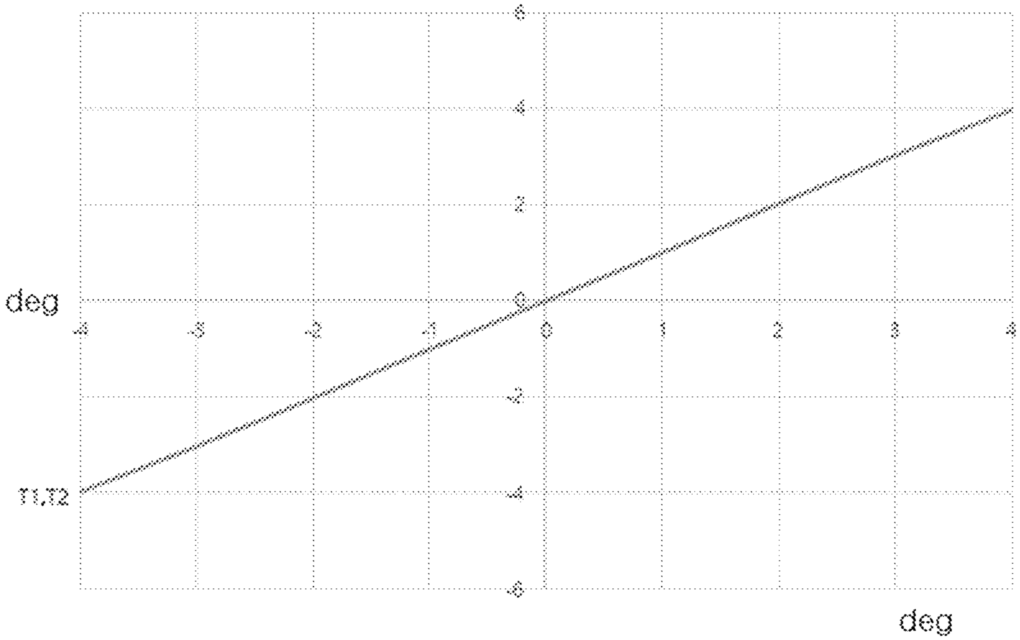
(b)
FIG. 13B

FIG. 14A
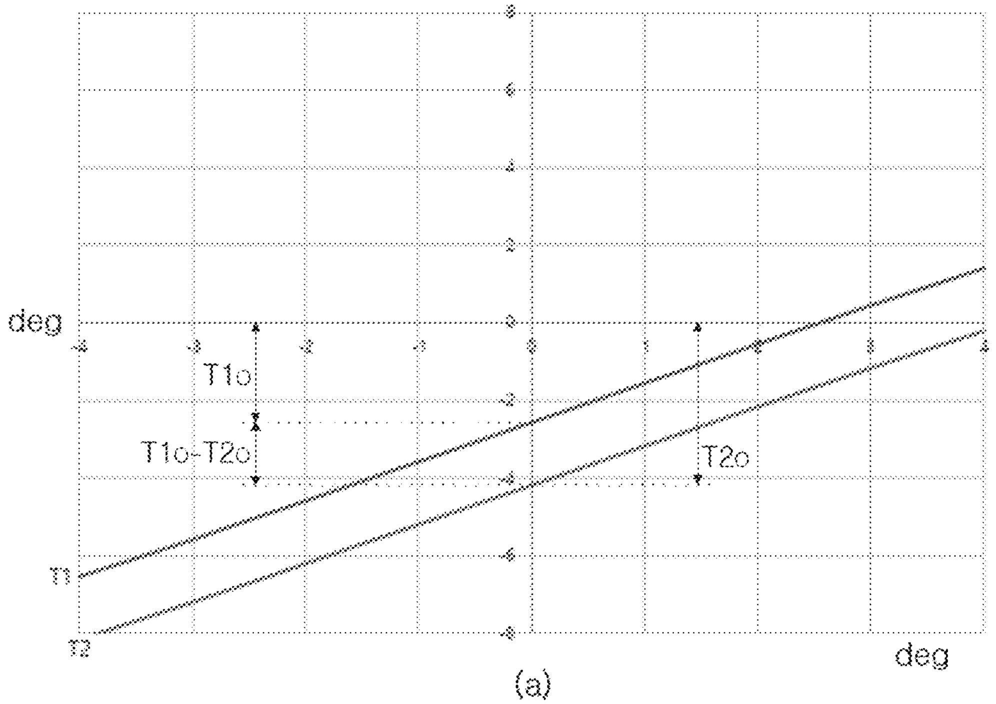
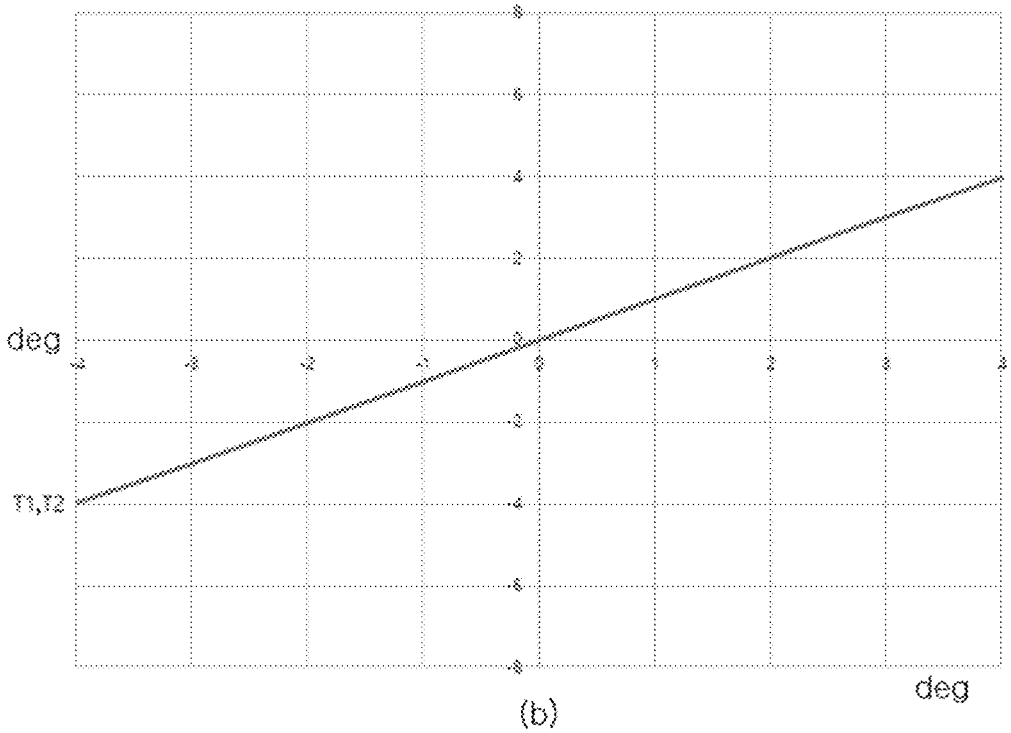
FIG. 14B

SENSING DEVICE

CROSS-REFERENCE TO RELATED APPLICATIONS

This application is the U.S. national stage application of International Patent Application No. PCT/KR2022/013611, filed Sep. 13, 2022, which claims the benefit under 35 U.S.C. § 119 of Korean Application No. 10-2021-0121500, filed Sep. 13, 2021, the disclosures of each of which are incorporated herein by reference in their entirety.

TECHNICAL FIELD

The present invention relates to a sensing device.

BACKGROUND ART

An electronic power steering system (EPS) drives a motor in an electronic control unit according to driving conditions to ensure turning stability and provide rapid restoration, thereby enabling a driver to drive safely.

The EPS includes a sensor device that measures a steering shaft torque and a steering angle to provide appropriate torque. The sensor device is a device for measuring the degree of twist of a torsion bar. The torsion bar is a member that connects the steering shaft, which is an input shaft connected to a handle, an output shaft connected to a power transmission component on a wheel side, and a member that connects the input shaft and the output shaft.

The sensor device includes a housing, a rotor, a stator including stator teeth, and a collector. In this case, the collector is disposed outside of the stator teeth. Accordingly, when an external magnetic field is generated, the collector serves as a conduit for the external magnetic field, thereby affecting a magnetic flux value of the sensor. When the sensor is affected in this way, an output value of the sensor device changes and the degree of twist of a torsion bar cannot be accurately measured.

DISCLOSURE

Technical Problem

The present invention is directed to providing a sensing device that may compensate for the amount of change in output values of a sensor by external magnetism.

Technical Solution

One aspect of the present invention provides a sensing device including a rotor, a stator disposed to correspond to the rotor, a first collector disposed on an upper side of the stator, and a second collector disposed on a lower side of the stator, wherein the first collector includes a first unit collector including a first plate and a first leg and a second unit collector including a second plate and a second leg, the second collector includes a third unit collector including a third plate and a third leg and a fourth unit collector including a fourth plate and a fourth leg, and an axial separation distance between the first plate and the stator is different from an axial separation distance between the second plate and the stator.

Another aspect of the present invention provides a sensing device including a rotor, a stator disposed to correspond to the rotor, a first collector disposed on an upper side of the stator, and a second collector disposed on a lower side of the stator, wherein the first collector includes a first unit collector and a second unit collector, wherein the first unit collector includes a first plate and a first leg that protrudes from the first plate and extends toward the second collector, the second unit collector includes a second plate and a second leg that protrudes from the second plate and extends toward the second collector, and the first plate and the second plate are disposed to be spaced apart from each other in an axial direction and disposed not to overlap each other in the axial direction.

Advantageous Effects

In an embodiment, since magnetic resistance of a collector varies, the performance of a sensor device can be secured by compensating for the amount of change in output values due to external magnetism.

In the embodiment, even when external magnetism greatly increases, the size of a compensation value is reduced because a difference value in magnetic flux values between collectors is used.

In the embodiment, the amount of change in output values due to external magnetism can be compensated for without significantly changing an existing collector structure.

DESCRIPTION OF DRAWINGS

FIGS. 10A and 10B are graphs illustrating a process of compensating sensitivity of a first sensor and sensitivity of a second sensor in a condition in which there is no external magnetism.

FIGS. 11A and 11B are graphs illustrating a process of compensating sensitivity of a first sensor and sensitivity of a second sensor in a condition in which there is external magnetism.

FIGS. 12A and 12B are graphs comparing a sensing value of a first sensor and a sensing value of a second sensor when there is no external magnetism.

FIGS. 13A and 13B are graphs comparing a sensing value of a first sensor and a sensing value of a second sensor when there is external magnetism (1500 A/m).

FIGS. 14A and 14B are graphs comparing a sensing value of a first sensor and a sensing value of a second sensor when there is relatively strong external magnetism (4500 A/m).

MODES OF THE INVENTION

Hereinafter, a direction perpendicular to an axial direction of a sensing device is called a radial direction, and a direction along a circle with a radius centered on an axis is called a circumferential direction.

Figure 1:
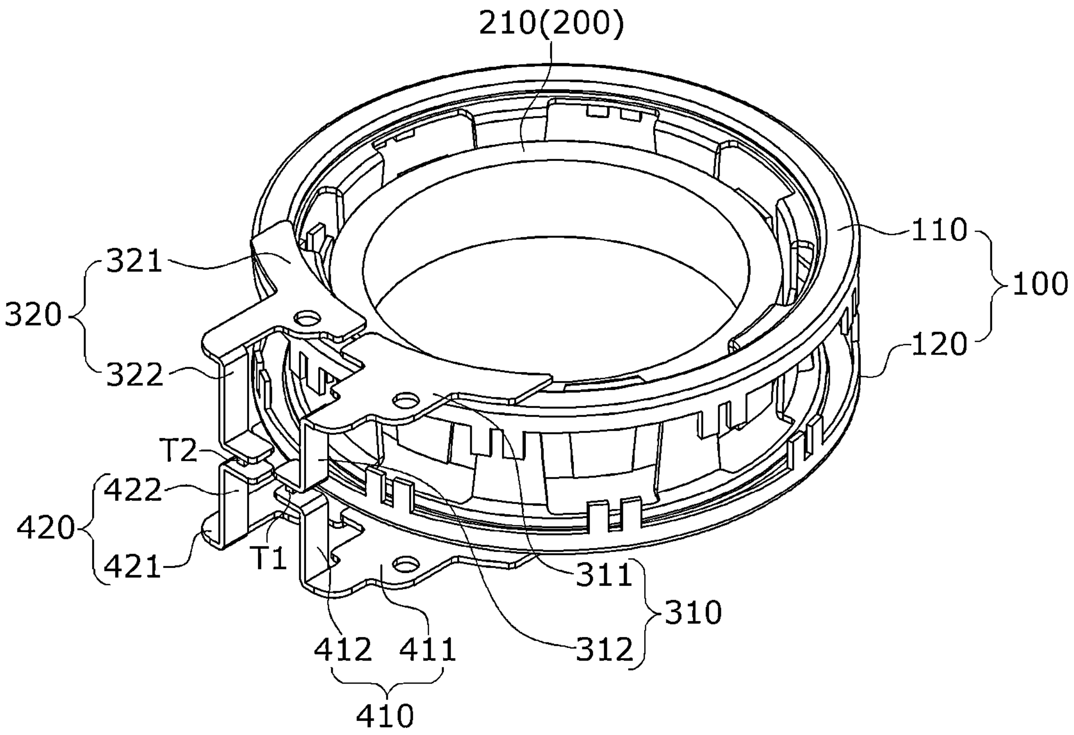
FIG. 1 is a perspective view illustrating a sensing device according to an embodiment.
Figure 2:
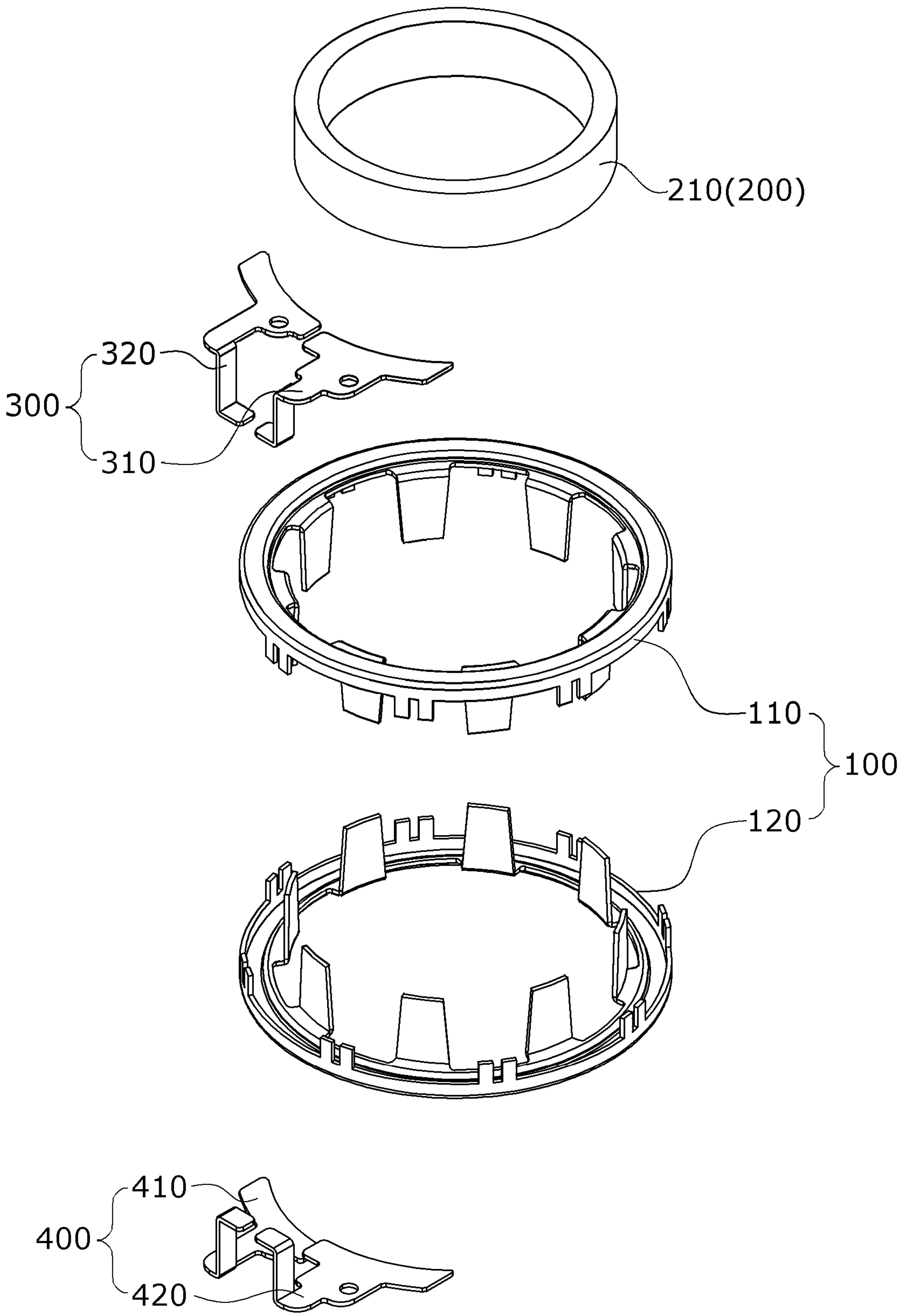
FIG. 2 is an exploded view of the sensing device illustrated in FIG. 1.
Figure 3:
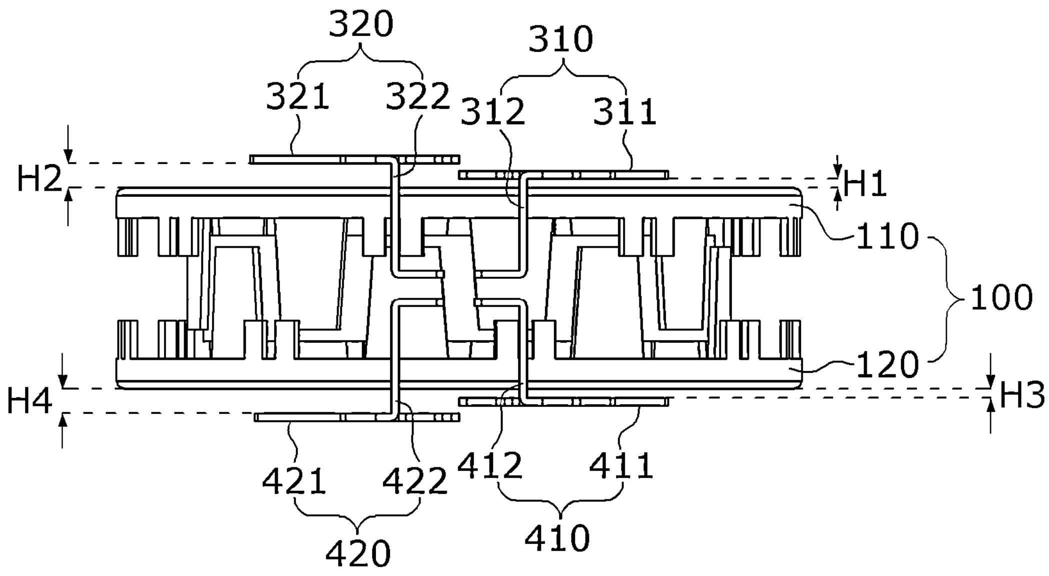
FIG. 3 is a front view of the sensing device illustrated in FIG. 1.

FIG. 1 is a perspective view illustrating a sensing device according to an embodiment, FIG. 2 is an exploded view of the sensing device illustrated in FIG. 1, and FIG. 3 is a front view of the sensing device illustrated in FIG. 1.

Referring to FIGS. 1 to 3, the sensing device according to the embodiment may include a stator 100, a rotor 200 partially disposed in the stator 100, a first collector 300, a second collector 400, a first sensor T1, and a second sensor T2.

Here, the stator 100 is connected to an output shaft (not shown), and the rotor 200 of which at least portion is rotatably disposed on the stator 100 may be connected to an input shaft (not shown), but is not necessarily limited thereto. Here, the rotor 200 may be disposed to be rotatable with respect to the stator 100. Hereinafter, a direction toward a center based on a radial direction is considered inward and the opposite direction is considered outward.

The stator 100, the first collector 300, and the second collector 400 may be fixed to a separate holder or housing.

The stator 100 may include first stator teeth 110 and second stator teeth 120.

The rotor 200 may include a magnet 210. The magnet 210 may be disposed inside the stator 100. The magnet 210 may be connected to the input shaft through a separate holder.

Each of the first sensor T1 and the second sensor T2 detects a change in a magnetic field generated between the stator 100 and the rotor 200. The first sensor T1 and the second sensor T2 may be Hall ICs. The sensing device measures torque based on the detected change in the magnetic field.

The first collector 300 may be disposed on an upper side of the stator 100. The second collector 400 may be disposed on a lower side of the stator 100. The first sensor T1 is disposed to correspond to the first collector 300 and the second collector 400. The second sensor T2 is also disposed to correspond to the first collector 300 and the second collector 400.

The first collector 300 may include the first unit collector 310 and the second unit collector 320. The first unit collector 310 and the second unit collector 320 are disposed not to overlap each other in an axial direction. The first unit collector 310 is a collector that is relatively less affected by external magnetism and has a high sensitivity corresponding to magnetic flux, and the second unit collector 320 is a collector that is relatively more affected by external magnetism and has a relatively low sensitivity corresponding to magnetic flux. The difference in sensing values between the first unit collector 310 and the second unit collector 320 is used to compensate for the amount of change in a sensing value due to an external magnetic field.

The first unit collector 310 may include a first plate 311 and a first leg 312. The first leg 312 protrudes from the first plate 311 and is disposed to extend toward the second collector 400. The first leg 312 is disposed to correspond to the first sensor T1.

The second unit collector 320 may include a second plate 321 and a second leg 322. The second leg 322 protrudes from the second plate 321 and is disposed to extend toward the second collector 400. The second leg 322 is disposed to correspond to the second sensor T2.

An axial separation distance H22 between the second plate 321 and the stator 100 may be greater than an axial separation distance H11 between the first plate 311 and the stator 100.

The second collector 400 may include a third unit collector 410 and a fourth unit collector 420. The third unit collector 410 and the fourth unit collector 420 are disposed not to overlap each other in an axial direction.

The third unit collector 410 is a collector that is relatively less affected by external magnetism, and the fourth unit collector 420 is a collector that is relatively more affected by external magnetism. The difference in sensing values between the third unit collector 410 and the fourth unit collector 420 is used to compensate for the amount of change in a sensing value due to an external magnetic field.

The third unit collector 410 may include a third plate 411 and a third leg 412. The third leg 412 protrudes from the third plate 411 and is disposed to extend toward the first collector 300. The third leg 412 is disposed to correspond to the first sensor T1.

The fourth unit collector 420 may include a fourth plate 421 and a fourth leg 422. The fourth leg 422 protrudes from the fourth plate 421 and is disposed to extend toward the first collector 300. The fourth leg 422 is disposed to correspond to the second sensor T2.

An axial separation distance H44 o between the fourth plate 421 and the stator 100 may be greater than an axial separation distance H33 between the third plate 411 and the stator 100.

Figure 4:
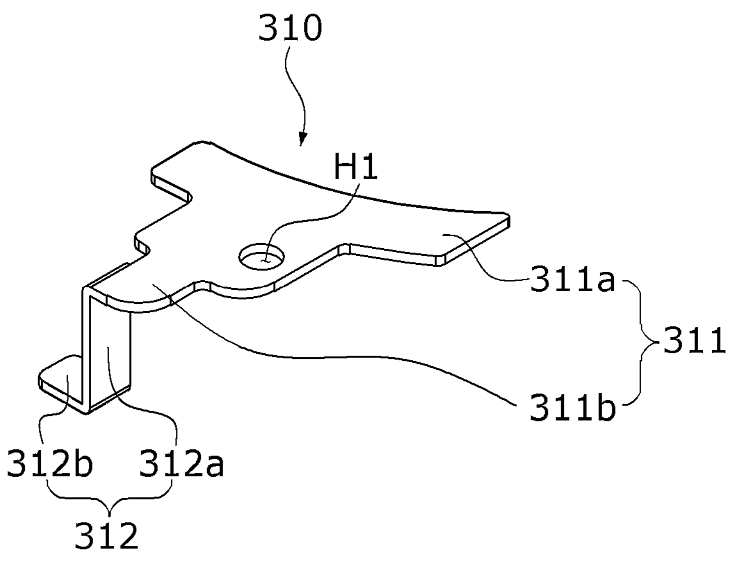
FIG. 4 is a perspective view illustrating a first unit collector.

FIG. 4 is a perspective view illustrating a first unit collector 310.

Referring to FIG. 4, the first unit collector 310 may include the first plate 311 and the first leg 312. The first plate 311 is a flat member and may include a first body 311*a* and a first extension portion 311*b*. An inner surface of the first body 311*a* may be curved. The first body 311*a* may include a plurality of fastening holes H1 for fixing the first unit collector 310. The first extension portion 311*b* is disposed to extend outward from the first body 311*a*. The first plate 311 may be fixed in a separate housing. The first leg 312 may be formed to be bent from the first extension portion 311*b*. The first leg 312 may include a first leg body 312*a* and a first tip 312*b*. The first leg body 312*a* is disposed to be bent downward from the first extension portion 311*b*. Also, the first tip 312*b* is bent in a circumferential direction on the first leg body 312*a* and disposed to face the first sensor T1.

Figure 5:
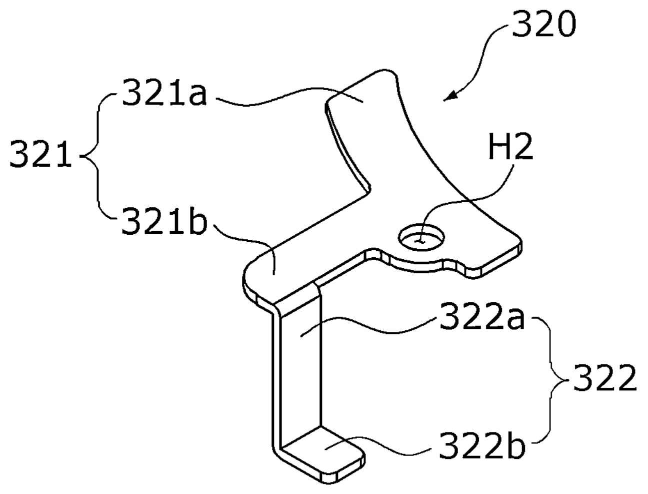
FIG. 5 is a perspective view illustrating a second unit collector.

FIG. 5 is a perspective view illustrating a second unit collector 320.

Referring to FIG. 5, the second unit collector 320 may include the second plate 321 and the second leg 322. The second plate 321 is a flat member and may include a second body 321*a* and a second extension portion 321*b*. An inner surface of the second body 321*a* may be curved. The second body 321*a* may include a plurality of fastening holes H2 for fixing the second unit collector 320. The second extension portion 321*b* is disposed to extend outward from the second body 321*a*. The second plate 321 may be fixed to a separate housing. The second leg 322 may be formed to be bent from the second extension portion 321*b*. The second leg 322 may include a second leg body 322*a* and a second tip 322*b*. The second leg body 322*a* is disposed to be bent downward from the second extension portion 321*b*. Also, the second tip 322*b* is bent on the second leg body 322*a* and disposed to face the second sensor T2.

Figure 6:
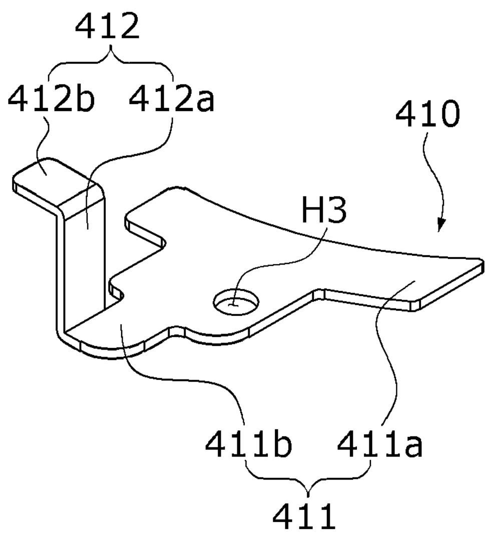
FIG. 6 is a perspective view illustrating a third unit collector.

FIG. 6 is a perspective view illustrating a third unit collector 410.

Referring to FIG. 6, the third unit collector 410 may include the third plate 411 and the third leg 412. The third plate 411 is a flat member and may include a third body 411*a* and a third extension portion 411*b*. An inner surface of the third body 411*a* may be curved. The third body 411*a* may include a plurality of fastening holes H3 for fixing the third unit collector 410. The third extension portion 411*b* is disposed to extend outward from the third body 411*a*. The third plate 411 may be fixed to a separate housing. The third leg 412 may be formed to be bent from the third extension portion 411*b*. The third leg 412 may include a third leg body 412*a* and a third tip 412*b*. The third leg body 412*a* is disposed to be bent upward from the third extension portion 411*b*. Also, the third tip 412*b* is bent in a circumferential direction on the third leg body 412*a* and disposed to face the first sensor T1. The third unit collector 410 may have the same shape and size as the first unit collector 310.

Figure 7:
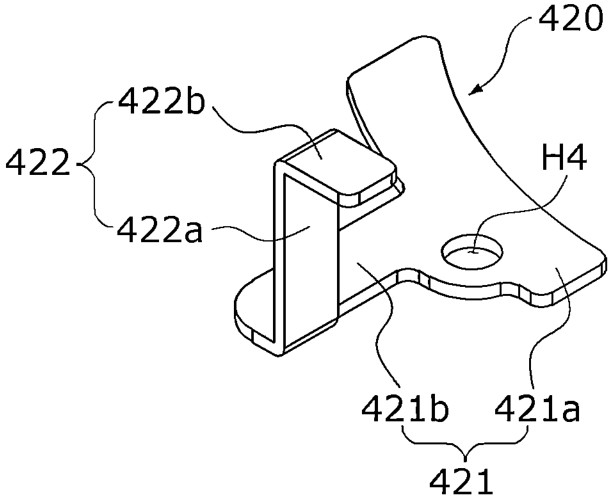
FIG. 7 is a perspective view illustrating a fourth unit collector.

FIG. 7 is a perspective view illustrating a fourth unit collector 420.

Referring to FIG. 7, the fourth unit collector 420 may include the fourth plate 421 and the fourth leg 422. The fourth plate 421 is a flat member and may include a fourth body 421*a* and a fourth extension portion 421*b*. An inner surface of the fourth body 421*a* may be curved. The fourth body 421*a* may include a plurality of fastening holes H4 for fixing the fourth unit collector 420. The fourth extension portion 421*b* is disposed to extend outward from the fourth body 421*a*. The fourth plate 421 may be fixed to a separate housing. The fourth leg 422 may be formed to be bent from the fourth extension portion 421*b*. The fourth leg 422 may include the fourth leg body 422*a* and the fourth tip 422*b*. The fourth leg body 422*a* is disposed to be bent upward from the fourth extension portion 421*b*. Also, the fourth tip 422*b* is bent in a circumferential direction on the fourth leg body 422*a* and disposed to face the second sensor T2. The fourth unit collector 420 may have the same shape and size as the second unit collector 320.

Figure 8:
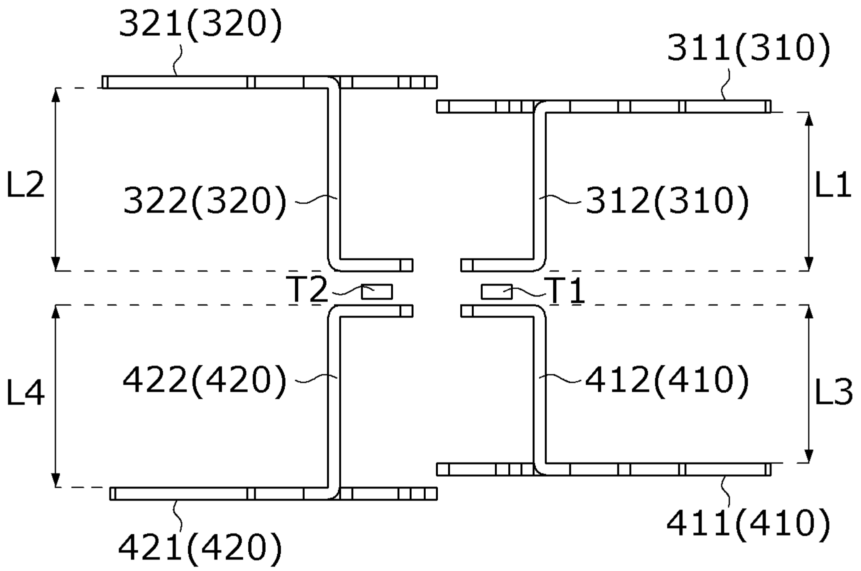
FIGS. 8 and 9 are views illustrating a first unit collector, a second unit collector, a third unit collector, and a fourth unit collector.
Figure 9:
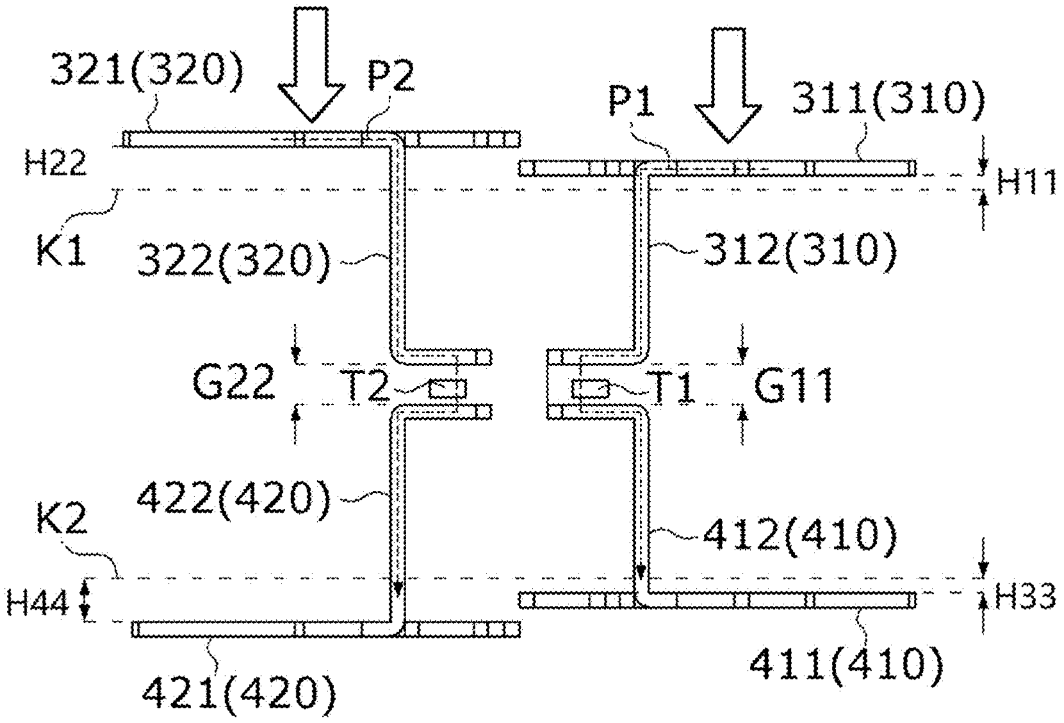

FIGS. 8 and 9 are views illustrating a first unit collector 310, a second unit collector 320, a third unit collector 410, and a fourth unit collector 420.

Referring to FIGS. 1, 8 and 9, in an axial direction, the first collector 300 may be disposed on one side of each of the first sensor T1 and the second sensor T2. The second collector 400 may be disposed on the other side of each of the first sensor T1 and the second sensor T2. In the axial direction, the first leg 312 of the first collector 300 and the third leg 412 of the second collector 400 are disposed with a first gap G11 therebetween. The first leg 312 and the third leg 412 are disposed to overlap in the axial direction. Also, in the axial direction, the second leg 322 of the first collector 300 and the fourth leg 422 of the second collector 400 are disposed with a second gap G22 therebetween. The second leg 322 and the fourth leg 422 are disposed to overlap in the axial direction. Each of the first gap G11 and the second gap G22 serves as magnetic resistance.

A line K1 in FIG. 9 is a virtual reference line indicating one end of the stator 100, and a line K2 in FIG. 9 is a virtual reference line indicating the other end of the stator 100.

The external magnetism is guided to the first leg 312 through the first plate 311. Additionally, the external magnetism is guided to the stator 100 through a space between the first plate 311 and the stator 100, thereby affecting a sensing value measured at the first sensor T1.

Also, the external magnetism is guided to the second leg 322 through the second plate 321. In addition, the external magnetism is guided to the stator 100 through a space between the second plate 321 and the stator 100, thereby affecting a sensing value measured by the second sensor T2.

The axial separation distance H22 between the second plate 321 and the stator 100 is greater than an axial separation distance H11 between the first plate 311 and the stator 100. Therefore, the sensitivity of the second unit collector 320 corresponding to magnetic flux is lower than that of the first unit collector 310. In addition, since external magnetism flowing into the stator 100 through an axial separation space between the second plate 321 and the stator 100 is different from external magnetism flowing into the stator 100 through an axial separation space between the first plate 311 and the stator 100, a sensing value measured at the second sensor T2 and a sensing value measured at the first sensor T1 change in response to the external magnetism.

When external magnetism occurs, the external magnetism flows along a second path P2 passing through the second plate 321, the second leg 322, the second sensor T2, and the fourth leg 422. In addition, external magnetism flows along a first path P1 passing through the second plate 321, the first plate 311, the first leg 312, the first sensor T1, and the third leg 412.

More magnetic flux flows through the first path PI than through the second path P2. In the case of the second path P2, the sensitivity to magnetic flux of the second unit collector 320 is low and external magnetism flows to the stator 100 more than in the case of the first path P1.

Therefore, in response to external magnetism, a difference occurs between a sensing value measured by the first sensor T1 and a sensing value measured by the second sensor T2.

Although not shown in the drawing, when external magnetism flows from a second collector 400, an axial separation distance H33 between the third plate 411 and the stator 100 is greater than an axial separation distance H44 between the fourth plate 421 and the stator 100. Therefore, a flow of magnetic flux is formed in the same way as when external magnetism flowing from a first collector 300, thereby resulting in a difference between a sensing value measured at the first sensor T1 and a sensing value measured at the second sensor T2.

Meanwhile, an axial length of the second leg 322 is greater than an axial length L1 of the first leg 312. Also, an axial length L4 of the fourth leg 422 is greater than an axial length L3 of the third leg 412.

In the sensing device, a process of compensating a sensing value of the first sensor T1 and a sensing value of the second sensor T2 corresponding to external magnetism is as follows.

The sensing value of the first sensor T1 is compensated by Equation 1 below.

$$T1c = T1o - a*(T2o - T1o) \quad \text{<Equation 1>}$$

Here, T1*c* is a compensated sensing value of the first sensor T1, T1*o* is a uncompensated sensing value of the first sensor T1, T2*o* is a uncompensated sensing value of the second sensor T2, and a is a compensation coefficient for the first sensor T1, which corresponds to a difference between the axial separation distance H22 between the second plate 321 and the stator 100 and the axial separation distance H11 between the first plate 311 and the stator 100.

Also, a sensing value of the second sensor T2 is compensated by Equation 2 below.

$$T2c = T2o - b * (T2o - T1o)$$ <Equation 2>

Here, T2*c* is a compensated sensing value of the second sensor T2, T1*o* is a uncompensated sensing value of the sensor T1, and T2*o* is a uncompensated sensing value of the second sensor T2, and b is a compensation coefficient for the second sensor T2, which corresponds to a difference between the axial separation distance H22 between the second plate 321 and the stator 100 and the axial separation distance H11 between the first plate 311 and the stator 100.

a and b may be preset values. a and b may also vary depending on shapes of the first unit collector 310 or the second unit collector 320.

The following description is given with a is 1.64 and b is 2.64.

FIGS. 10A and 10B are graphs illustrating a process of compensating sensitivity of a first sensor T1 and sensitivity of a second sensor T2 in a condition in which there is no external magnetism. As shown in FIG. 10A, the first sensor T1 and the second sensor T2 in a condition in which there is no external magnetism have a difference in sensitivity corresponding to magnetic flux. The sensitivity of the second sensor T2 is lower than the sensitivity of the first sensor T1. As shown in FIG. 10B, the sensitivity of the first sensor T1 and the sensitivity of the second sensor T2 may be directly compensated in a process of outputting a sensing value (output angle) of the first sensor T1 and a sensing value (output angle) of the second sensor T2 in a condition in which there is no external magnetism.

FIGS. 11A and 11B are graphs illustrating a process of compensating sensitivity of a first sensor T1 and sensitivity of a second sensor T2 in a condition in which there is external magnetism.

As shown in FIG. 11A, when there is external magnetism, the first sensor T1 and the second sensor T2 are affected by the external magnetism. Accordingly, an offset G1 occurs in the first sensor T1, and a relatively large offset G2 occurs in the second sensor T2. Therefore, in a condition in which there is external magnetism as shown in FIG. 11B, after the sensitivity of the first sensor T1 and the sensitivity of the second sensor T2 are compensated, an offset occurs in each of a sensing value T1*o* of the first sensor T1 and a sensing value T2*o* of the second sensor T2.

Due to this offset, the sensing value T1*o* of the first sensor T1 and the sensing value T2*o* of the second sensor T2 have a constant difference value (T1*o*–T2*o*) in the entire range of angles.

FIGS. 12A and 12B are graphs comparing a sensing value of a first sensor T1 and a sensing value of a second sensor T2 when there is no external magnetism. FIG. 12A shows an uncompensated sensing value of the first sensor T1 and an uncompensated sensing value of the second sensor T2, and FIG. 12B shows a compensated sensing value of the first sensor T1 and a compensated sensing value of the second sensor T2.

When there is no external magnetism, as can be seen in Equations 1 and 2, the sensing value of the first sensor T1 and the sensing value of the second sensor T2 are the same, that is, T2*o*–T1*o* becomes 0 and an uncompensated sensing value of the first sensor T1 and a compensated sensing value of the first sensor T1 are the same. Also, an uncompensated sensing value of the second sensor T2 and a compensated sensing value of the second sensor T2 are the same.

FIGS. 13A and 13B are graphs comparing a sensing value of a first sensor T1 and a sensing value of a second sensor T2 when there is external magnetism (1500 A/m). FIG. 13A shows an uncompensated sensing value of the first sensor T1 and an uncompensated sensing value of the second sensor T2, and FIG. 13B shows a compensated sensing value of the first sensor T1 and a compensated sensing value of the second sensor T2.

When there is external magnetism (1500 A/m), a difference value (T2*o*–T1*o*) between a sensing value of the first sensor T1 and a sensing value of the second sensor T2 is detected as 0.54. When a is 1.64 and b is 2.64, a compensated sensing value of the first sensor T1 is obtained through Equation 1, and when a compensated sensing value of the second sensor T2 is obtained through Equation 2, as shown in FIG. 13B it may be confirmed that the compensated sensing value of the first sensor T1 and the compensated sensing value of the second sensor T2 are the same and offset does not occur but is compensated for.

FIGS. 14A and 14B are graphs comparing a sensing value of a first sensor T1 and a sensing value of a second sensor T2 when there is relatively strong external magnetism (4500 A/m). FIG. 14A shows an uncompensated sensing value of the first sensor T1 and an uncompensated sensing value of the second sensor T2, and FIG. 14B shows a compensated sensing value of the first sensor T1 and a compensated sensing value of the second sensor T2.

When there is relatively strong external magnetism (4500 A/m), a difference value (T2*o*–T1*o*) between a sensing value of the first sensor T1 and a sensing value of the second sensor T2 is detected as 1.62. When a is 1.64 and b is 2.64, a compensated sensing value of the first sensor T1 is obtained through Equation 1, and when a compensated sensing value of the second sensor T2 is obtained through Equation 2, a small offset 0.002 deg occurs as shown in FIG. 14B, but it can be seen that the compensated sensing value of the first sensor T1 and the compensated sensing value of the second sensor T2 are almost identical.

Figure 15:
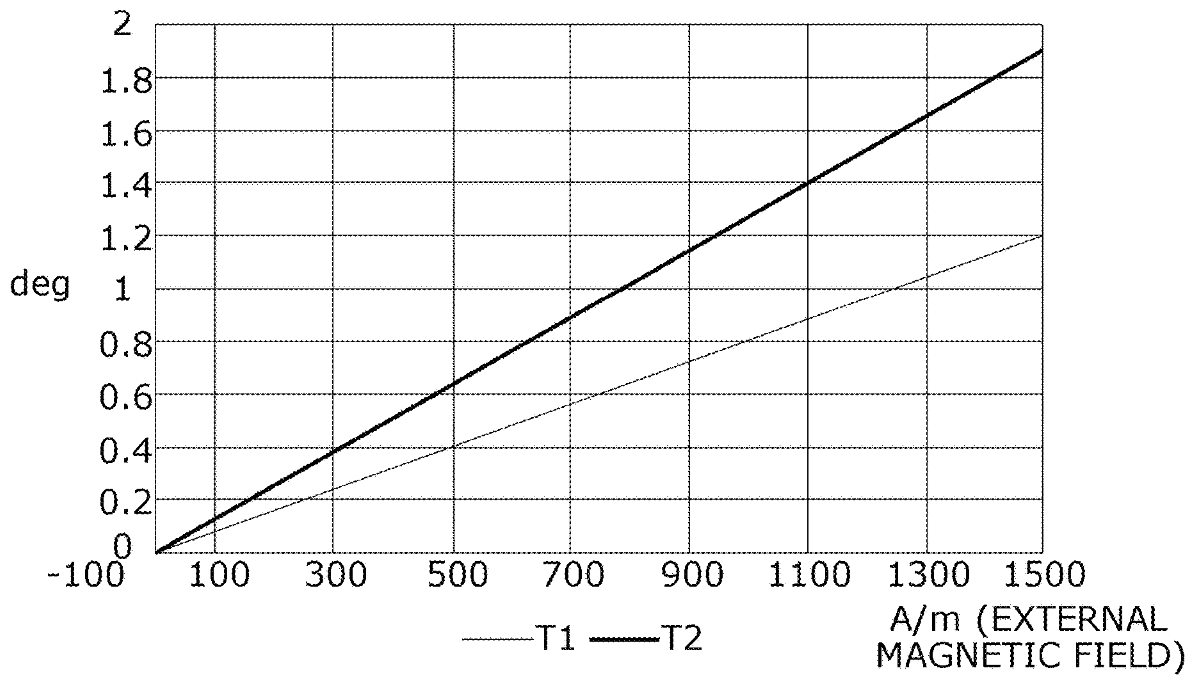
FIG. 15 is a graph comparing an offset of a first sensor and an offset of a second sensor in response to an external magnetic field.
Figure 16:
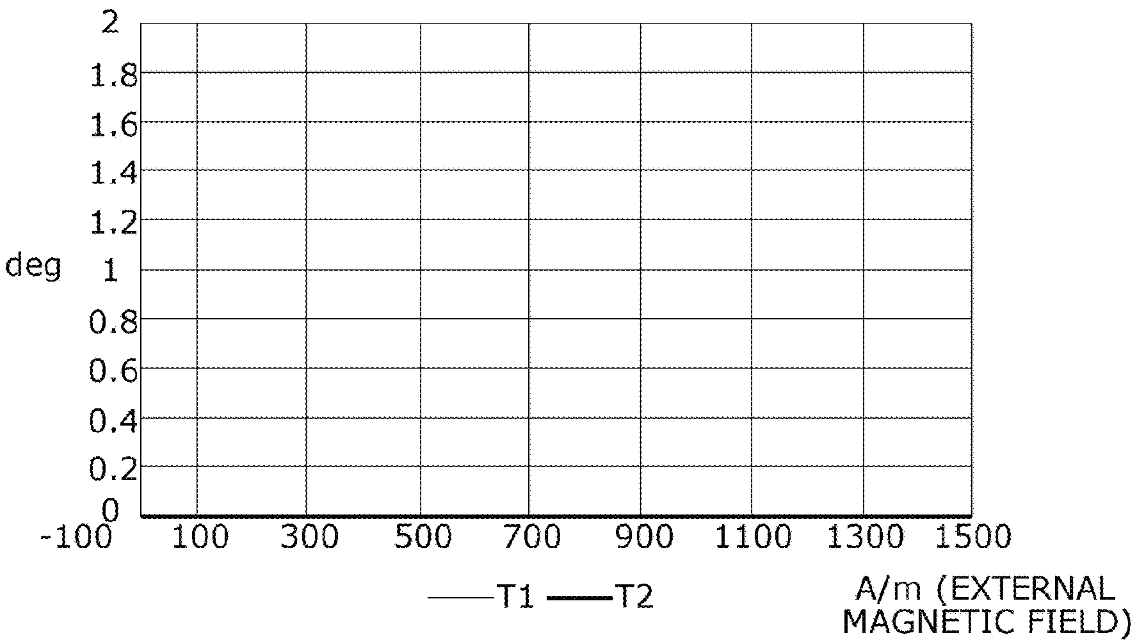
FIG. 16 is a graph comparing an offset of a first sensor and an offset of a second sensor in response to an external magnetic field, after compensation.

FIG. 15 is a graph comparing an offset of a first sensor T1 and an offset of a second sensor T2 in response to an external magnetic field, and FIG. 16 is a graph comparing an offset of a first sensor T1 and an offset of a second sensor T2 in response to an external magnetic field, after compensation.

Referring to FIG. 15, as an external magnetic field increases, the offset of the first sensor T1 and the offset of the second sensor T2 increase linearly. Also, as the external magnetic field increases, the offset of the second sensor T2 increases more significantly than the offset of the first sensor T1.

In the performed compensation process described above, as shown in FIG. 16, it can be confirmed that an offset of the first sensor T1 and an offset of the second sensor T2 do not occur regardless of the increase in the external magnetic field.

The above-described embodiments may be used in various devices such as vehicles or home appliances.

The invention claimed is:

1. A sensing device comprising:

a rotor;

a stator disposed to correspond to the rotor; and a first collector disposed on an upper side of the stator and a second collector disposed on a lower side of the stator, wherein the first collector includes a first unit collector including a first plate and a first leg and a second unit collector including a second plate and a second leg, the second collector includes a third unit collector including a third plate and a third leg and a fourth unit collector including a fourth plate and a fourth leg, and an axial separation distance between the first plate and the stator is different from an axial separation distance between the second plate and the stator.

2. A sensing device comprising:
a rotor;
a stator disposed to correspond to the rotor; and
a first collector disposed on an upper side of the stator and a second collector disposed on a lower side of the stator,
wherein the first collector includes a first unit collector and a second unit collector,
the first unit collector includes a first plate and a first leg that protrudes from the first plate and extends toward the second collector,
the second unit collector includes a second plate and a second leg that protrudes from the second plate and extends toward the second collector, and
the first plate and the second plate are disposed to be spaced apart from each other in an axial direction and disposed not to overlap each other in the axial direction.

3. The sensing device of claim 1, wherein:
the first plate and the second plate are disposed not to overlap each other in an axial direction; and
the third plate and the fourth plate are disposed not to overlap each other in the axial direction.

4. The sensing device of claim 1, wherein an axial length of the second leg is greater than an axial length of the first leg, and an axial length of the fourth leg is greater than an axial length of the third leg.

5. The sensing device of claim 2, wherein an axial length of the second leg is greater than an axial length of the first leg.

6. The sensing device of claim 1, wherein a size of the first plate corresponds to a size of the second plate, and a size of the third plate corresponds to a size of the fourth plate.

7. A sensing device comprising:
a rotor;
a stator disposed to correspond to the rotor;
a first collector disposed on an upper side of the stator and a second collector disposed on a lower side of the stator; and
a first sensor and a second sensor disposed between the first collector and the second collector,
wherein the first collector includes a first unit collector and a second unit collector that do not overlap each other in an axial direction, and
a sensing value of at least one of the first sensor and the second sensor is compensated for a difference value of a sensing value of the first sensor by magnetic flux transmitted to the first unit collector and a sensing value of the second sensor by magnetic flux transmitted to the second unit collector.

8. The sensing device of claim 7, wherein the sensing value of the first sensor is compensated for a compensation value calculated by Equation 1 below, $$T1c = T1o - a*(T2o - T1o) \quad \text{[Equation 1]}$$

where T1$c$ is a compensated sensing value of the first sensor, T1$o$ is a uncompensated sensing value of the first sensor, T2$o$ is a uncompensated sensing value of the second sensor, and a is a compensation coefficient corresponding to an axial separation distance between the first unit collector and the second unit collector.

9. The sensing device of claim 7, wherein the sensing value of the second sensor is compensated for a compensation value calculated by Equation 2 below, $$T2c = T2o - b*(T2o - T1o) \quad \text{[Equation 2]}$$

where T2$c$ is a compensated sensing value of the second sensor, T1$o$ is a uncompensated sensing value of the first sensor, T2$o$ is a uncompensated sensing value of the second sensor, and b is a compensation coefficient corresponding to an axial separation distance between the first unit collector and the second unit collector.

10. The sensing device of claim 7, wherein:
the first unit collector includes a first plate and a first leg that protrudes from the first plate and extends toward the second collector;
the second unit collector includes a second plate and a second leg that protrudes from the second plate and extends toward the second collector; and
the first plate and the second plate are disposed to be spaced apart from each other in the axial direction.

* * * * *